April 18, 1950 L. R. LUDWIG ET AL 2,504,855
RETARDED LATCH TRIP CIRCUIT BREAKER
Filed June 9, 1944 3 Sheets-Sheet 1

WITNESSES:
C. J. Weller.
Paul D. Harlem.

INVENTORS
Leon R. Ludwig, William H. Stuellein
and Gayne D. Gamel.
BY
Ralph H. Swingle
ATTORNEY

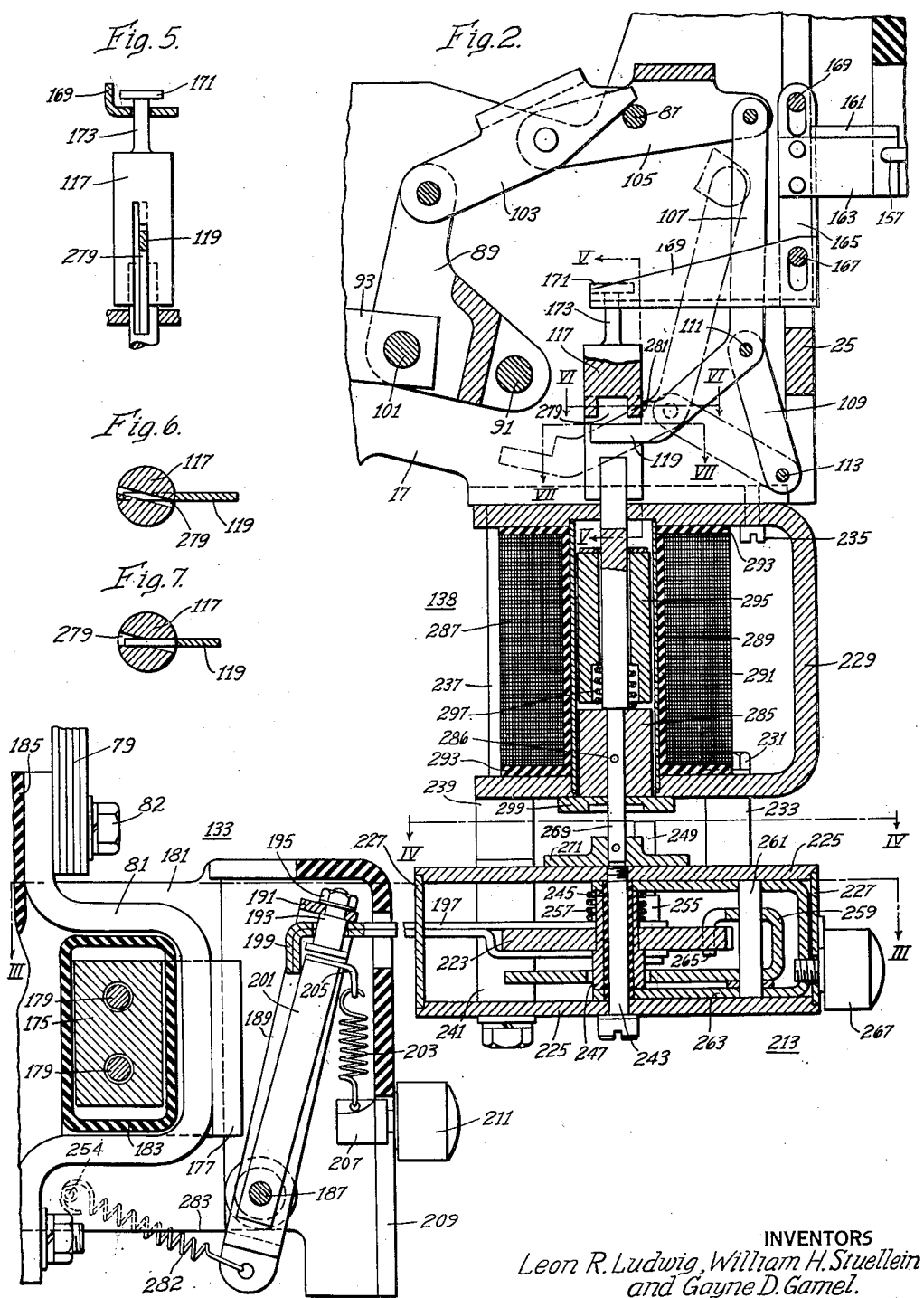

April 18, 1950 L. R. LUDWIG ET AL 2,504,855
RETARDED LATCH TRIP CIRCUIT BREAKER
Filed June 9, 1944 3 Sheets-Sheet 3
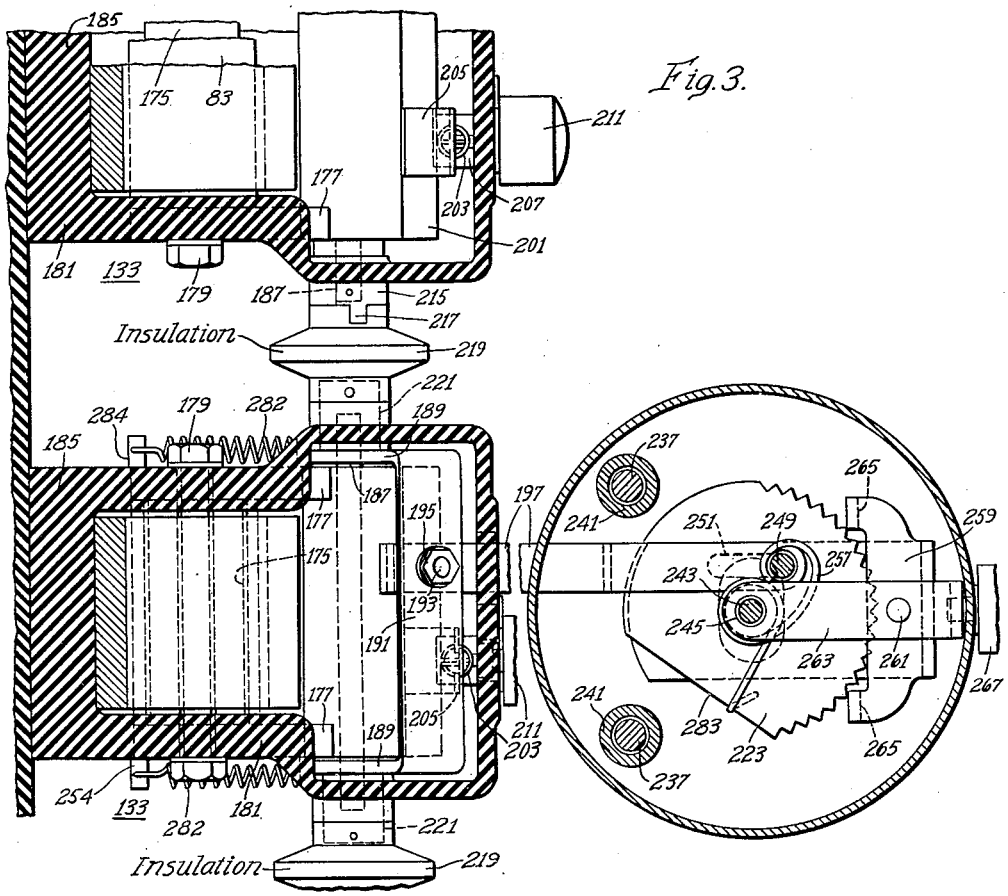
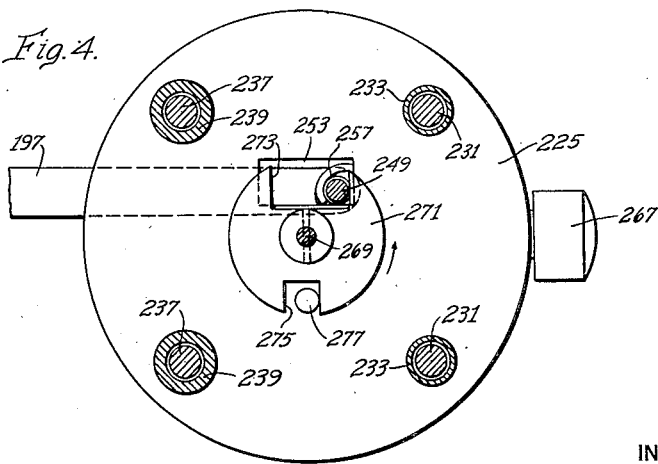
WITNESSES:
C. J. Weller
Paul D. Harlen
INVENTORS
Leon R. Ludwig, William H. Stuellein
and Gayne D. Gamel.
BY
Ralph W. Swingle
ATTORNEY Patented Apr. 18, 1950

2,504,855

UNITED STATES PATENT OFFICE 2,504,855

RETARDED LATCH TRIP CIRCUIT BREAKER

Leon R. Ludwig, Wilkinsburg, William H. Stuellein, East McKeesport, and Gayne D. Gamel, Verona, Pa., assignors to Westinghouse Electric Corporation, East Pittsburgh, Pa., a corporation of Pennsylvania Application June 9, 1944, Serial No. 539,450

9 Claims. (Cl. 200—108)

This invention relates to circuit breakers and, more particularly to circuit breakers embodying electromagnetic tripping means for instantaneously tripping the breaker in response to overload currents above a predetermined value and after a time-delay in response to overloads of lesser value.

Certain features disclosed but not claimed in this application are fully disclosed and claimed in copending divisional application, Serial No. 42,314, filed Aug. 3, 1948, by Leon R. Ludwig, William H. Stuellein and Gayne D. Gamel and assigned to the assignee of the present invention.

An object of the invention is to provide a circuit breaker having an electromagnetic trip device with an improved, adjustable time-delay device which is also effective to prevent tripping of the breaker as a result of sudden shocks or jarring forces.

Another object of the invention is to provide a circuit breaker having an electromagnetic trip device with an improved mechanical time-delay device which prevents tripping of the breaker in response to shocks or jarring forces but which permits instantaneous tripping of the breaker.

Another object of the invention is to provide a circuit breaker having an electromagnetic trip device with a time-delay device comprising a mechanical escapement mechanism which prevents tripping of the breaker in response to shocks and jarring forces but which permits instantaneous and time-delay tripping of the breaker in response to overload currents occurring during the existence of shocks or jarring forces.

Another object of the invention is to provide a multi-pole circuit breaker having an electromagnetic trip device associated with each of at least two poles of the breaker with a single time-delay device disposed in a manner to permit instantaneous and time-delay tripping of the breaker but which prevents tripping of the breaker in response to shocks or jarring forces.

Another object of the invention is to provide a multi-pole circuit breaker having an electromagnetic trip device associated with each of a least two poles of the breaker with a single time-delay device common to said trip devices for delaying tripping of the breaker by said trip devices, the time-delay device preventing tripping of the breaker in response to shocks or jarring forces, and an electromagnetic trip device operable independently of said time-delay device to trip the breaker.

Another object of the invention is to provide a circuit breaker having a plurality of electromagnetic trip devices with a latch member operable in one direction by one of said trip devices to trip the breaker and operable in another direction by another of said trip devices to trip the breaker, said one trip device being provided with a time-delay device to delay tripping of the breaker by each of said trip devices which time-delay device also prevents tripping of the breaker by said trip devices in response to shocks and jarring forces, the circuit breaker being also provided with an electromagnetic trip device operable to trip the breaker independently of the time-delay device, and means to prevent tripping operation of said independent trip device in response to shocks and jarring forces.

Another object of the invention is to provide a circuit breaker with a novel trip mechanism wherein a latch member is rotated by an electromagnetic trip device to trip the breaker, the latch member being moved axially by a second electromagnet trip device to trip the breaker.

In accordance with the invention, there is provided a circuit breaker having a main latch that is movable rotatably by any one of a plurality of trip devices. A single time-delay device is provided to delay the rotary tripping movement of the latch and to prevent rotary tripping movement of the latch in response to shocks. There is further provided a separate trip device for moving the latch axially independently of the time-delay device to trip the breaker, and a separate shock-proof device for preventing axial movement of the latch in response to shocks.

The novel features that are considered characteristics of the invention are set forth in particular in the appended claims. The invention itself, however, both as to structure and operation, together with additional objects and advantages thereof, will be best understood from the following detailed description of one embodiment thereof when read in conjunction with the accompanying drawings, in which:

Fig. 2 is an enlarged vertical sectional view of the trip mechanism;

Fig. 3 is a horizontal sectional view of the trip mechanism taken on line III—III of Fig. 2, showing the time-delay device.

Fig. 4 is a sectional view taken on line IV—IV of Fig. 2.

Fig. 5 is a fragmentary view partly in section on line V—V of Fig. 2 showing the latch mechanism.

Fig. 6 is a sectional view taken on line VI—VI of Fig. 2 showing the cooperation of the latch member with the tripping toggle.

Fig. 7 is a sectional view taken on line VII—VII of Fig. 2.

Figure 1:
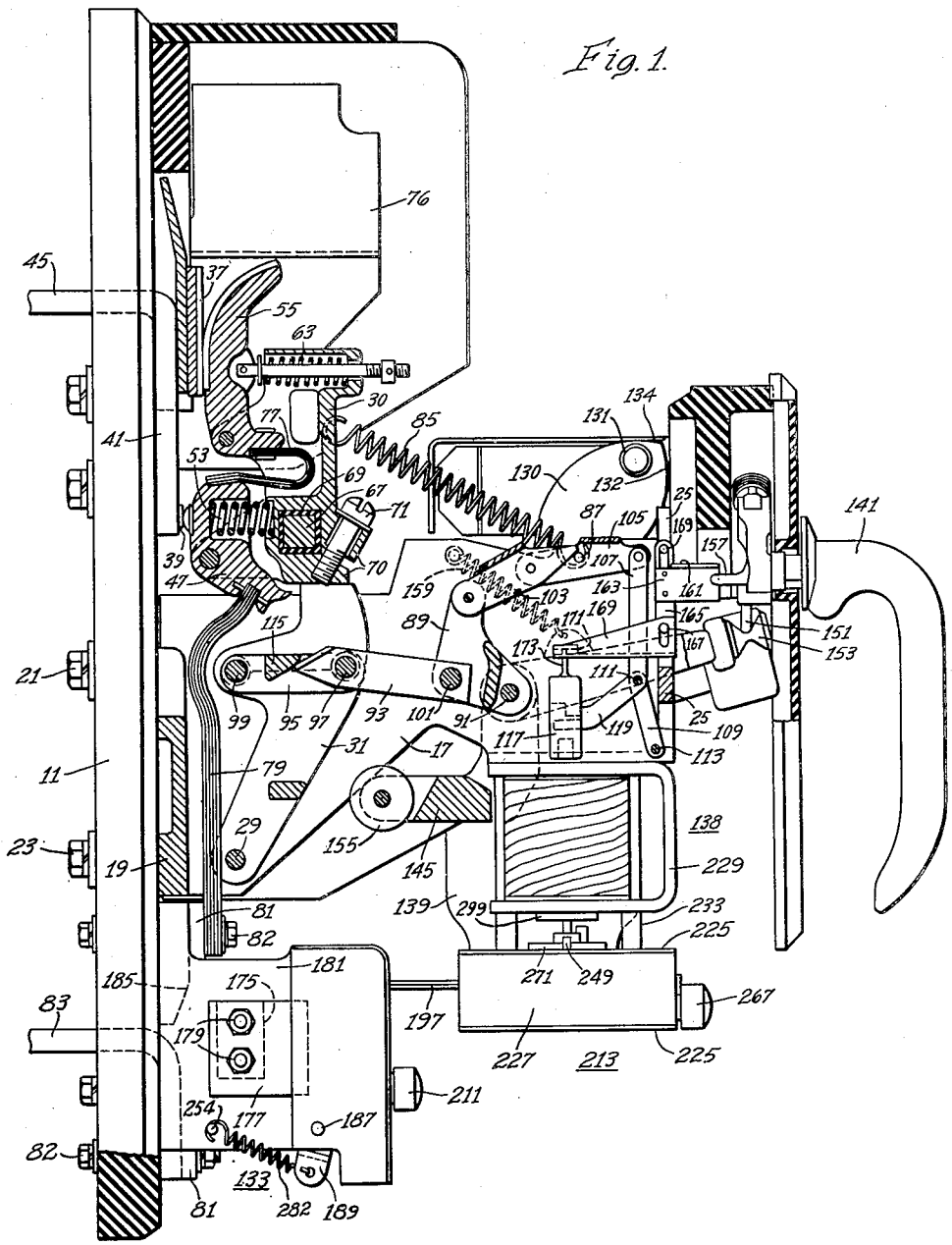
Figure 1 is a vertical sectional view through the center pole of a three-pole circuit breaker embodying the principles of the invention.

Referring to Fig. 1 of the drawings, the circuit breaker is provided with an operating mechanism common to all of the poles of the breaker. The operating mechanism is mounted in a U-shaped frame 17 having sides which are rigidly connected by a cross member 19. The frame 17 is mounted on the central portion of a base 11 of insulating material and is secured thereto by means of bolts 21 and 23. The outer ends of the frame are rigidly connected by a cross-member 25.

A shaft 29 extending through openings in the sides of the frame 17 pivotally supports a pair of contact-arms 31 having their free ends integral with a contact-arm 30 for the center pole. The contact-arms (not shown) for the outer poles of the breaker are identical with the contact arm 30 for the center pole, but are not provided with arms 31. The contact-arms for the outer poles are rigidly secured to a tie-bar 67 which extends across all of the poles and which is securely clamped to the center-pole contact-arm 30 by means of split clamp 70 and a screw 71. The three contact-arms are thus mechanically connected for movement together. Rectangular tubes 69 of insulating material between the tie-bar 67 and the contact-arms 30 for the several poles serve to insulate the three movable contact-arms and their associated contacts from the tie-bar 67.

The movable contact structures and the stationary structures for the several poles are alike; hence only the contacts for the center pole are illustrated. The contact-arm 30 pivotally carries a main movable contact-member 47 and a movable arcing contact-member 55 which cooperate respectively with a main stationary contact 39 and a stationary arcing contact 37. The stationary contacts 39 and 37 are secured to a conductor 41 which extends through an opening in the base 11 and forms a terminal-connector 45. Contact pressure for the main contacts is provided by a spring 53 disposed between the contact-arm 30 and the main movable contact-member 47. Similarly, a spring 63 provides contact pressure for the arcing contacts.

When the contact-arm 30 is moved to open the contacts, the arc drawn across the arcing contacts 55—37 by rupture of the current is drawn into an arc-extinguisher indicated generally at 76 where it is cooled and extinguished. Any suitable arc-extinguisher may be employed, the one shown comprising, generally, a stack of slotted plates (not shown) of magnetic material disposed adjacent the path of travel of the arcing contact-member 55.

The movable arcing contact-member 55 is connected by a flexible shunt conductor 77 to the main movable contact-member 47, and another flexible shunt conductor 79 connects the contact-member 47 to a conductor 81. The conductor 81 extends downwardly forming the energizing means for a tripping electromagnet (to be later described) and is secured at its lower end by means of a bolt 82 to the inner end of a terminal-connector 83 which, together with the terminal-connection 45, serves to connect the breaker in an electrical circuit.

The electrical circuits for the several poles of the breaker are essentially the same. The circuit for the center pole extends from the terminal 45 through the conductor 41, the main contact-members 39—47, the flexible shunt conductor 79, the conductor 81 to the terminal 83. The circuit for the arcing contacts 37—55 extends from the terminal 45, through the conductor 41, the arcing contact-members 37—55, the flexible shunt conductor 77, the main contact-member 47, and through the previously described circuit to the terminal 83.

The contact-arms 30 are biased in a clockwise or opening direction by means of a pair of springs 85 (only one being shown). These springs are tensioned between the center-pole contact-arm 30 and a fixed pivot 87 supported in the main frame 17. In the closed position of the breaker, the center-pole contact-arm and consequently all of the contact-arms are releasably restrained in the closed contact position by means of a toggle and linkage mechanism which is collapsible to cause opening of the contacts. The toggle and linkage form a part of the common operating mechanism.

This collapsible linkage includes a yoke-shaped lever 89 pivotally mounted on a fixed pivot 91 supported on the main frame 17. The lever 89 is operatively connected to the support arms 31 of the center-pole contact-arm 30 by a main operating toggle comprising toggle-links 93 and 95. The toggle-link 93 has one end pivoted on a pin 101 supported on the lever 89, and the link 95 is pivoted on a pivot pin 99 in the arms 31. The links 93 and 95 are pivotally connected by a knee-pivot pin 97. The toggle-link 95 comprises a pair of links rigidly connected by means of an integral cross-bar 115.

The free end of the lever 89 is pivotally connected by means of a link 103 to one arm of a lever 105 pivoted on the fixed pivot 87. The other end of the lever 105 is pivotally connected to a toggle-link 107 of a tripping toggle comprising the link 107 and a toggle-link 109. The link 109 is pivoted on a fixed pivot 113 supported on the frame 17. The toggle-links 107 and 109 are pivotally connected by a knee-pivot pin 111. The lever 105 and the link 103 each comprises a pair of members rigidly connected by yokes substantially as illustrated.

The above-described linkage serves to releasably hold the contact structure including the movable contacts for all of the poles of the breaker in closed contact position. In the closed position, the main operating toggle 93—95 is over center above a line through the centers of the pins 99 and 101, and a second toggle, one link of which comprises the overcenter links 93—95 and the other link of which comprises the lever 89, is over center above a line through the centers of the pins 99 and 91. The overcenter movement of the main operating toggle 93—95 is limited by the projecting end of the link 93 engaging the cross-bar 115 of the link 95.

With the main operating toggle 93—95 and the toggle comprising the links 93—95 and the lever 89 in the overcenter position, the springs 85 bias the lever 89 in a clockwise direction. Clockwise movement of the lever 89, however, is normally prevented by the tripping toggle 107—109 which is restrained in a slightly underset position by a latch member 117 (Figs. 1, 2 and 5) cooperating with an extension 119 of the toggle-link 107. As will be described hereinafter, the latch-member 117 may be operated to release the extension 119 and permit collapse of the toggle 107—109 and opening of the contacts. In its restrained position, the tripping toggle 107—109, acting through the lever 105 and the link 103, prevents clockwise movement of the lever 89, and consequently holds the movable contacts in closed position against the biasing influence of the springs 85.

The latch-member 117 is adapted to be actuated to cause collapse at the tripping toggle to effect opening of the contacts by means of an overload-trip device indicated generally at 133, or by a shunt-trip device indicated generally at 138. The overload-trip device 133 is operable in response to overload currents in the circuit of the breaker to rotate the latch 117 and cause collapse of the tripping toggle 107—109. The shunt-trip device is adapted to be energized from any suitable source separate from the circuit of the breaker to move the latch 117 axially and cause the collapse of the tripping toggle 107—109 independently of the overload-trip device 133.

When rotated by the trip device 133, or moved axially upwardly by the trip device 138, the latch-member 117 releases the extension 119 of the toggle-link 107 and permits collapse of the tripping toggle 107—109 which permits clockwise rotation of the lever 89 thus permitting the springs 85 to actuate the movable contact structure clockwise (Fig. 1) to open the contacts.

The main operating toggle 93—95 does not immediately collapse, but the force of the springs 85 applied through the contact-arms 30—31 and the main operating toggle causes collapse of the toggle comprising the links 93—95 and the lever 89 which results in a clockwise movement of the lever 89. This movement is transmitted through the link 103 and the lever 105 to complete the collapse of the tripping toggle 107—109.

The clockwise or opening movement of the contact-arms 30—31 is arrested by projections (not shown) thereon striking the frame 17. At this time, the rebound of the inertia of the main-operating toggle 93—95 and the parts of the linkage 89, 103 and 105 starts the main-operating toggle 93—95 over center in a direction to cause its collapse. By the time the knee-pin 97 of the toggle has passed over center below the line 99—101, the weight of the parts acts to complete the collapse of the toggle 93—95 and causes the linkage 89, 103, 105 and the tripping toggle 107—109 to be automatically reset to their normal holding positions and relatched. The main toggle 93—95 remains in collapsed condition until the contacts are closed.

The contacts are closed manually by clockwise rotation of the handle 141. This movement of the handle, through connections not shown, thrusts a link 151 downwardly, and, due to the engagement of the link with a projection 153 on a yoke-shaped closing lever 145, rotates the closing lever in a clockwise direction. The closing lever 145 comprises a pair of spaced levers disposed on the outside of the frame 17 and are pivotally supported on the fixed pivot 91. Clockwise movement of the closing lever 145 engages a roller 155 pivotally carried on the inner end of the lever with the toggle link 93, now in its collapsed position, and moves the toggle 93—95 to its overcenter position. Since at this time the tripping toggle 107—109 has been restored to its holding position and relatched, rotation of the lever 89 is prevented, and consequently the force applied by the roller 155 to straighten the operating toggle 93—95 rotates the contact arms 30 counterclockwise to close the contacts and tension the springs 85.

The handle 141 is restored to its normal position by means of a spring 159 tensioned between the closing lever 145 and the frame 17. Upon release of the handle following a closing operation, the spring 159 moves the closing lever 145 counterclockwise and, through the projection 153 and link 151, restores the handle 141 to its normal position.

The closing lever 145 may also be operated to automatically close the contacts through the agency of a motor 139 mounted on a plate (not shown), but which is attached to the side of the frame 17. The motor 139 may be energized from any suitable source, and when energized is adapted, through a suitable driving connection, to rotate a crank disc 130. The disc 130 carries an anti-friction roller 131 which, upon rotation of the disc, engages a cam face 132 on an arm 134, secured to the closing lever 145, and rotates the arm and the closing lever clockwise to effect closing of the contacts. As soon as the roller 131 passes out of engagement with the arm 134, the spring 159 acts to restore the lever 145 to its normal position. The motor 139 is deenergized by a suitable limit switch (not shown).

The circuit breaker may be tripped manually by rotation of the handle 141 through a small angle in a counter-clockwise direction from its neutral position. Rotation of the handle 141 in tripping direction engages a projection 157 on the link 151 with an ear 161 formed on a plate 163 (Fig. 2) secured to a slide 165 disposed in an opening in the cross-member 25 of the frame 17 and slidable vertically on a pair of rods 167 mounted in the cross-member 25 of the frame. The lower portion of the slide 165 is formed over to provide a laterally extending part 169 which is adapted to engage a head 171 on the end of a projection 173 integral with or otherwise suitably attached to the latch-member 117. Upon rotation of the handle 141 (Fig. 1) in tripping direction, the link 151 is moved upwardly. During this movement, the projection 157 (Fig. 2) engages the ear 161 and raises the slide 165. This movement engages the extension 169 with the head 171 and raises the latch-member 117 to effect release of the tripping toggle 107—109 and opening of the contacts.

As previously set forth, the latch member 117 is rotated to release the underset tripping toggle 107—109 by means of the current-responsive trip-device 133. There is a trip-device 133 provided for each pole of the breaker, but since the trip-devices for the several poles are alike only the one for the center pole shown in Figs. 2 and 3 will be described.

The trip-device 133 (Figs. 2 and 3) includes a fixed magnetic core-member 175 provided with pole-pieces 177 secured thereto by means of bolts 179 which also serve to clamp the parts to an insulating frame 181. The core-member 175 is surrounded by an insulating tube 183 to insulate it from the energizing conductor 81 which is looped around the core member between the pole-pieces 177. The frame 181 is provided with a cross-member 185 integral therewith which is secured to the base 11 of the breaker by means of the bolt 82 by which the conductor 81 and the flexible conductor 79 are secured together and to the base 11. Mounted for rotation in the frame 181 is a shaft 187 having the legs 189 of a yoke or trip-bar 191 mounted thereon for movement relative thereto, the trip-bar 191 being operable by the trip-devices for all the poles. A headed and shouldered stud 193, secured to the yoke 191 by a nut 195, projects through an opening in a link 197 which connects the trip device to a time delay device indicated generally at 213. The inner end of the link 197 is formed over at right angles as at 199 to cooperate with an armature 201 mounted on the shaft 187 for movement relatively thereto. The armature 201 is biased to unattracted position as shown in Figure 2 by means of a spring 203 having one end attached to a spring-clip 205 secured to the free end of the armature and the other end attached to an adjustable member 207. The member 207 has a reduced portion disposed in a vertical slot 209 in the outer wall of the frame 181 and is provided with a thumb-screw 211 for clamping the member 207 in its adjusted position in the slot 209. By loosening the thumb screw 211 and sliding the member 207 in the slot 209, the tension of the spring 203 may be varied thereby varying the minimum current value at which the trip-device will function to trip the breaker.

The trip-devices for the two outer poles of the breaker are the same as the trip-device for the center pole with the exception that the yoke or trip-bar 191 is omitted and the armatures 201 for the outer poles are secured to the corresponding shafts 187 for movement therewith. On the end of the shaft 187 adjacent the center-pole trip-device is secured a collar 215 (Fig. 3) having a projection 217 thereon which is adapted to engage a shoulder on a connector 219 of insulating material. The connector 219 is secured to a hub 221 which is rotatably mounted in a bearing in the side-wall of the frame 181 and is secured to the leg 189 of the yoke 191 for movement therewith. Two connections 219 are provided, one disposed on each end of the yoke 191 for operatively connecting the two outer pole-armatures 201 to the yoke so that any one of the armatures will operate the yoke, upon energization of its corresponding trip-magnet, without displacing the other armatures.

The link 197 (Fig. 2) comprises two members welded or otherwise suitably secured together at their left-hand ends and having their right-hand ends formed to straddle a ratchet-wheel 223 (Figs. 2 and 3). The ratchet-wheel 223 is rotatably supported in a housing comprising spaced-circular plates 225 and a cylindrical side-wall 227. The upper plate 225 is secured to the lower leg of a U-shaped bracket 229, which supports the shunt trip-device 138, by means of a pair of bolts 231 and is spaced from the bracket by spacers 233 surrounding the bolts 231 (see also Fig. 4). The upper leg of the bracket 229 is secured to the spaced main frame-members of the circuit-breaker by means of a pair of screws 235 (only one being shown) and a pair of bolts 237 which extend through both plates 225, both legs of the U-shaped bracket 229 and threadedly engage the frame-members 17. Spacers 239 (Figs. 2 and 4) surrounding the bolts 237 serve to space the time-delay housing from the lower leg of the bracket 229 and spacers 241 (Figs. 2 and 3) also surrounding the bolts 237 space the upper and lower plates of the time-delay device-housing apart. The plates 225 are also rigidly joined by a headed screw 243 (Fig. 2) which passes through an opening in the lower plate and threadedly engages the upper plate 225. Surrounding the screw 243 is a sleeve 245 upon which is mounted a shouldered sleeve 247 supporting the ratchet wheel 223.

As previously stated, the bifurcated end of the link 197 straddles the ratchet-wheel 223. The link 197 is connected to the ratchet-wheel by means of a pin and slot-connection comprising a pin 249 (Figs. 2, 3 and 4) which extends through both portions of the link 197, through an elongated slot 251 (Fig. 3) in the ratchet-wheel 223 and through a clearance-opening 253 (Fig. 4) in the upper plate 225 of the housing of the time-delay device. The lower end of the pin 249 is headed and a collar 255 threadedly engages the pin above the upper portion of the link 197 to retain the pin 249 in place in the assembly. The pin 249 projects through the clearance-opening 253 in the upper plate 225 for the purpose of rotatably actuating the trip-member 117 (Fig. 2) to trip the breaker in a manner more fully described hereinafter.

A spring 257 (Figs. 2 and 3) coiled about the sleeve 247 has one end hooked around the pin 249 and the other end hooked over the ratchet-wheel 223 in the manner shown in Fig. 3. Normally the spring 257 is not under tension, but when the link 197 is moved toward the left (Fig. 3) by the operation of the electromagnetic trip device of any one of the poles of the breaker, the pin 249 places the spring under tension in a direction to cause counter-clockwise rotation of the ratchet-wheel 223. The speed of rotation of the ratchet-wheel is governed by an oscillator 259, the two arms of which alternately engage the teeth of the ratchet in the usual manner.

The oscillator 259 is U-shaped and is mounted for oscillation on a pin 261 which is mounted in the legs of a U-shaped movable member 263 pivoted on the ends of the sleeve 245 surrounding the screw 243. The spaced ends of the upper leg of the oscillator 259 are formed downwardly as at 265 (Figs 2 and 3) to engage the ratchet-wheel. The lower leg of the oscillator extends to the left to form a governing weight for the oscillator, a clearance opening being provided therein for clearing the sleeve 247.

The amount of time-delay provided by the time-delay device is adjustably determined by adjusting the oscillator circumferentially relative to the ratchet-wheel. This adjustment is effected by rotating the member 263 in which the oscillator is mounted about its pivot on the sleeve 245. This adjustment is accomplished by means of a thumb-screw 267 having a threaded portion extending through an elongated annular slot in the side-wall 227 of the housing and threadedly engaging the yoke of the member 263. By loosening the thumb-screw 267 and rotating the U-shaped member 263 counter-clockwise or clockwise the oscillator is correspondingly moved in the same direction from the position in which it is shown in Figure 3, respectively, lengthening or shortening the time-delay.

As previously stated, the pin 249 projects through the clearance-opening 253 (Fig. 4) in the upper plate 225 of the time-delay device housing to operate the latch-member 117 and effect tripping of the breaker. The latch-member 117 is rigidly secured on the upper end of a trip rod 269 which extends vertically through the center of the shunt trip-device 138. A disc 271 secured on the lower end of the rod 269 is provided with two recesses 273 and 275 (Fig. 4). The pin 249 (Figs. 2, 3 and 4) extends upwardly through the recess 273 and a substantial distance above the disc 271. The side-walls of the recess 275 are adapted to engage a stop-stud 277 which projects upwardly from the upper plate 225 to limit the rotary movement of the disc and of the latch-member 117.

Referring particularly to Figs. 5, 6 and 7 of the drawings, the latch-member 117 is provided with a vertically disposed slot 279 into which the projection 119 of the tripping toggle-link 107 extends. The projection 119 has a latching shoulder 281 which normally rests against the periphery of the latch-member to restrain the tripping toggle in its slightly under-set holding position. At the point of latching engagement of the shoulder 281 with the latch-member, the slot 279 has straight parallel sides and is disposed at a slight angle relative to the projection 119 as shown in Fig. 6. At the point where the projection 119 extends into the slot 279, the sides of the slot are flared as shown in Fig. 7 to permit unlatching rotation of the latch-member.

The operation of the trip device and time-delay device is described as follows: Upon the occurrence of an overload-current in any pole of the breaker below a predetermined value, for instance, below 1000% of normal rated current, the armature 201 of the affected pole is attracted by the fixed magnetic core member and pole-pieces. If the overload occurs in one of the outer poles of the breaker, the armature operates through the projection 217 (Fig. 3) to actuate the yoke or trip-bar 191 and move the link 197 toward the left. If the overload occurs in the center pole, the armature engages the formed over-end 199 of the link 197 to move the link toward the left. Leftward movement of the link 197 through the pin 249 and spring 257 rotates the ratchet-wheel 223 counter-clockwise (Fig. 3) under the control of the oscillator 259 without substantially increasing the tension of the spring 257. After the mechanism has operated a predetermined distance the pin 249 engages the wall of the recess 273 (Fig. 4) in the disc 271 and rotates the disc 271, the rod 269 and the latch 117 counter-clockwise until arrested by the wall of the recess 275 striking the stop-stud 277. The movement of the disc 271 and the latch-member 117 after the engagement of the pin 249 with the disc is sufficient to align the straight portion of the slot 279 (Fig. 6) in the latch-member with the latching shoulder 281 on the projection 119 thereby permitting collapse of the tripping toggle 107—109 (Figs. 1 and 2) and opening of the contacts in the manner previously described.

The ratchet wheel 223 is provided with a flat surface 283 the one end of which, during a tripping operation, passes the lower arm of the oscillator, whereupon the pull of the magnet is unrestrained and instantaneously moves the pin 249 the remaining distance to trip the breaker. By moving the oscillator relative to the ratchet-wheel so that a greater or lesser number of teeth is required to pass the oscillator before the wheel escapes from the oscillator, a longer or shorter time-delay may be effected.

As soon as the current is interrupted and the trip magnet is deenergized, the spring 203 acts to restore the armature 201 of the affected pole to its unattracted position. The yoke 191, link 197 and the time-delay device are restored to their unoperated positions by means of springs 282 (Figs. 2 and 3) having one end attached to the lower ends of the legs 189 of the yoke 191 and having their other ends attached to spring-studs 254 projecting from the sides of the housing 181.

The provision of the mechanical escapement time-delay device connected to the tripping yoke makes the trip-device shockproof since the yoke 191 (Fig. 2) is firmly restrained against operation in response to shocks and jarring forces due to the inertia of the ratchet-wheel 223 and the oscillator 259. Undesirable tripping operation of the latch 117 in response to shocks transmitted to the trip-device in a horizontal direction through the supporting structure 11 and 181 and also through the supporting structure 17—229 to the time-delay device, is thereby prevented.

As was previously set forth, the latch-member 117 is moved axially upwardly by means of the shunt trip-device 138 to release the tripping toggle 107—109 to thereby cause collapse of the operating linkage and opening of the contacts. The shunt trip-device comprises a movable core-member 285 of magnetic material and an energizing winding 287. The movable core-member 285 is secured to a reduced portion of the rod 269 by means of a pin 286 and is adapted to lift the rod upon energization of the winding 287. The movable core member is disposed for vertical movement in a tube 289 of non-magnetic material, the ends of which are seated in counterbores in the upper and lower legs of the U-shaped frame 229. The winding 287 is wound on a tube 291 of insulating material surrounding the tube 289 and is insulated from the legs of the bracket 229 by means of insulating plates 293. Disposed in the tube 289 above the movable core-member 285 is a secondary-movable core-member 295 also of magnetic material. The secondary core-member 295 is spaced apart from the movable core 285 by means of a spring 297 coiled about the rod 269, and is movable axially relative to the core-member 285 and the rod 269. The spring 297 is seated on top of the movable core 285 and in a counterbore in the secondary core 295.

The winding 287 is energized from any suitable source (not shown) either automatically or by the closure of a manually operable switch (also not shown) in the energizing circuit. When the coil is energized, the movable core 285 is attracted upwardly and thrusts the rod 269 and the latch-member 117 upwardly to free the tripping toggle 107—109 in the manner previously described in connection with the description of the manual tripping of the breaker. The upward movement of the rod 269 and latch 117 is limited by the disc 271 on the lower end of the rod striking a member 299 secured to the bottom leg of the bracket 229. Upon deenergization of the winding 287, the movable core 285, the secondary core 295, the trip-rod 269 and the latch 117 are all restored to their normal unattracted positions by the force of gravity.

The purpose of the separate secondary core-member 295 and the spring 297 is to absorb the kinetic energy of the movable core 285, the rod 269 and the latch 117 imparted thereto as a result of shocks or jarring forces, and thus prevent undesirable tripping of the breaker in response to shocks. The only force due to shock that would cause false tripping movement of the movable core 285 and the trip-rod 269 is in a vertical direction and comes from the supporting structure 11, 17 and 229. Any shock in a vertical direction imparted to the supporting structure will be transmitted to the movable core 285 which results in accelerating the movable core and the trip-rod 269 upwardly in tripping direction. The spring 297 is relatively weak and serves only to provide a desirable air-gap between the two core-members 285 and 295. When the movable core 285 and trip-rod 269 are moved upwardly in response to shock, the secondary core 295 will remain substantially stationary until the movable core strikes it. When this occurs, the secondary core 295 is accelerated upwardly thereby absorbing substantially all of the kinetic energy of the movable core 285. At the same time, the spring 297 was compressed as the movable core 285 approached the secondary core 295, and the energy stored therein reacts to move the secondary core 295 upwardly. The result is that, after the collision of the core-members, the secondary core 295, having a higher rate of acceleration than the movable core 285, will rebound from the upper leg of the bracket 229 and strike the movable core 285, thus providing an additional retarding force which is effective to prevent upward movment of the latch 117 and tripping of the breaker in response to sudden shocks or jarring forces.

From the foregoing description it will be apparent that there is provided a circuit-breaker having a main latch which is movable rotatably by any one of a plurality of overload trip-devices to trip the breaker and movable axially by a separate trip-device to trip the breaker. There is also provided a mechanical time-delay device for delaying tripping of the breaker by any one of the plurality of trip-devices, the time-delay device also serving to prevent rotary tripping operation of the latch in response to shocks. There is also provided means for preventing axial tripping movement of the latch in response to shocks. A further advantage of the invention lies in the adjustment of the oscillator of the time-delay device relative to the ratchet-wheel to vary the amount of time-delay.

While the invention has been disclosed in accordance with the provisions of the patent statutes, it is to be understood that various changes in the structural details thereof may be made without departing from the spirit of the invention.

We claim as our invention:

1. In a multi-pole circuit breaker, relatively movable contacts, operating mechanism for said contacts, latch means for releasably restraining said operating mechanism in closed position, said latch means being rotatable and movable axially to release said operating mechanism to thereby cause opening of said contacts, electroresponsive means for each pole operable in response to predetermined circuit conditions in the associated pole, a trip member operable by at least two of said electroresponsive means to rotate said latch and release said operating mechanism, a time-delay device operatively related to said trip member for delaying operation of said latch, and electroresponsive means for moving said latch axially independently of said time-delay device to release said operating mechanism.

2. In a multi-pole circuit breaker, relatively movable contacts for each pole, operating means comprising a linkage normally holding said contacts closed and collapsible to effect opening of said contacts, latch means for restraining said linkage in holding condition, said restraining means being operable in two directions to release said linkage, electroresponsive means for each pole operable in response to predetermined circuit conditions in the corresponding pole to operate said latch in one direction, a time-delay device operatively related to said electroresponsive means to delay operation of said latch in said one direction, and separate electroresponsive means for operating said latch in another direction independently of said time-delay device to release said linkage.

3. In a multi-pole circuit breaker, relatively movable contacts for each pole, operating means comprising a linkage normally holding said contacts closed and collapsible to effect opening of said contacts, means for restraining said linkage in holding condition, said restraining means being operable in two directions to release said linkage, electroresponsive means for each pole operable in response to predetermined circuit conditions in the corresponding pole to operate said restraining means in one direction, a time-delay device comprising a mechanical escapement device operatively related to said electroresponsive means to delay operation of said restraining means in said one direction, and separate electroresponsive means for operating said restraining means in another direction independently of said time-delay device to release said linkage, said time-delay device acting to prevent operation of said electroresponsive means in response to but only during the existence of sudden shocks or jarring forces.

4. In a multi-pole circuit breaker, relatively movable contacts for each pole, an operating mechanism for said contacts, a rotatable latch operable to cause circuit-opening operation of said operating mechanism, said latch being also movable axially to cause circuit-opening operation of said operating mechanism, a trip member common to at least two of the poles and operable to rotate said latch, electroresponsive means for each pole operable in response to abnormal circuit conditions in the related pole for operating said trip member, a time-delay device for retarding operation of said trip member and rotation of said latch in response to abnormal circuit conditions below a predetermined value occurring in any pole of the breaker, means relating said time-delay device to said trip member to permit said trip member to instantaneously rotate said latch in response to abnormal circuit conditions above said predetermined value, and a trip device operable to move said latch axially independently of said trip member and said time-delay device to trip the breaker.

5. In a circuit breaker comprising an operating mechanism, a trip device including a tripping toggle operable to effect circuit opening operation of said operating mechanism, latch means restraining said toggle and movable rotatably and axially to release said toggle, an electromagnet including an armature operable upon energization of said magnet to rotate said latch means to release said toggle, a time-delay device for delaying rotation of said latch means by said armature, and a second electromagnet operable when energized to operate said latch means axially independently of said time-delay device to release said toggle, said time-delay device opposing rotary operation of said latch means by said armature in response to sudden shocks or jarring forces, and means for preventing axial operation of said latch means in response to sudden physical shocks or jarring forces.

6. In a multi-pole circuit breaker, an operating mechanism including a toggle operable to permit circuit opening operation of said mechanism, means restraining said toggle in operative position, said restraining means being movable rotatably and axially to release said toggle, a trip bar common to at least two of the poles for rotating said restraining means to release the toggle, electromagnetic means operable in response to abnormal circuit conditions occurring in any pole of the breaker to operate said trip bar, separate electromagnetic means operable when energized to directly operate said restraining means axially to release said toggle, time-delay means comprising a mechanical escapement device for at times delaying rotation of said restraining means, said time-delay means acting to prevent rotation of said restraining means by the first named electromagnetic means in response to shocks or jarring forces, and a member engageable by said separate electromagnetic means when said separate electromagnetic means is moved in response to physical shocks or jarring forces to oppose axial tripping movement of said restraining means.

7. In a circuit breaker comprising relatively movable contacts and operating mechanism for said contacts including a toggle operable to effect circuit-opening operation of said operating mechanism, a latch for restraining said toggle in operative position, said latch having an elongated slot therein through which a portion of said toggle extends, a first electromaget operable when energized to rotate said latch to release said toggle, a second electromagnet operable when energized to move said latch longitudinally to release said toggle, a time-delay device for retarding tripping rotation of said latch by said first electromagnet, and means cooperating with said second electromagnet to prevent longitudinal tripping movement of said latch in response to sudden shocks or jarring forces.

8. In a circuit breaker comprising an operating mechanism, means releasable to effect circuit opening operation of said operating mechanism, latch means releasably restraining said releasable means, said latch means being rotatable and also movable axially to release said releasable means, electroresponsive means operable when energized to rotate said latch means to release said releasable means, means for preventing rotation of said latch means in response to sudden shocks, electroresponsive means operable when energized to move said latch means axially to release said releasable means, and means comprising a mass disposed to prevent axial movement of said latch means in response to sudden shocks or jarring forces.

9. In a circuit breaker comprising an operating mechanism therefor, means releasable to effect circuit opening operation of said operating mechanism, latch means releasably restraining said releasable means, said latch means being rotatable and also movable axially to release said releasable means, a first electroresponsive means operable when energized to rotate said latch means to release said releasable means, means for preventing rotation of said latch means in response to but only during the existence of sudden shocks, a second electroresponsive means operable when energized to move said latch means axially to release said releasable means, and an inertia member cooperating with said second electroresponsive members for preventing axial movement of said latch means in response to but only during the existence of sudden shocks or jarring forces.

LEON R. LUDWIG.
WILLIAM H. STUELLEIN.
GAYNE D. GAMEL.

REFERENCES CITED

The following references are of record in the file of this patent:

UNITED STATES PATENTS

| Number | Name | Date |
| --- | --- | --- |
| 522,527 | Larson | July 3, 1894 |
| 832,705 | Stewart | Oct. 9, 1906 |
| 1,120,222 | Murray et al. | Dec. 8, 1914 |
| 1,123,288 | Hellmund | Jan. 5, 1915 |
| 1,280,595 | Van Wijk | Oct. 1, 1918 |
| 1,866,808 | Ireland | July 12, 1932 |
| 2,081,727 | Barenyi | May 26, 1937 |
| 2,340,973 | May et al. | Feb. 8, 1944 |

FOREIGN PATENTS

| Number | Country | Date |
| --- | --- | --- |
| 196,305 | Great Britain | Apr. 11, 1923 |